United States Patent
Gilson et al.

(10) Patent No.: US 12,395,207 B2
(45) Date of Patent: *Aug. 19, 2025

(54) RADIO FREQUENCY WAVEGUIDE SYSTEM NODES

(71) Applicant: RTX Corporation, Farmington, CT (US)

(72) Inventors: Jonathan Gilson, West Hartford, CT (US); Joseph V. Mantese, Ellington, CT (US); Gurkan Gok, Milford, CT (US); Joseph Zacchio, Wethersfield, CT (US); Coy Bruce Wood, Ellington, CT (US); William R. Shaw, Westbrook, CT (US)

(73) Assignee: RTX CORPORATION, Farmington, CT (US)

( * ) Notice: Subject to any disclaimer, the term of this patent is extended or adjusted under 35 U.S.C. 154(b) by 148 days.

This patent is subject to a terminal disclaimer.

(21) Appl. No.: 18/315,713

(22) Filed: May 11, 2023

(65) Prior Publication Data

US 2024/0088940 A1 Mar. 14, 2024

Related U.S. Application Data

(63) Continuation of application No. 17/497,616, filed on Oct. 8, 2021, now Pat. No. 11,652,508.

(51) Int. Cl.
*H04B 3/52* (2006.01)
*H01P 3/00* (2006.01)
(Continued)

(52) U.S. Cl.
CPC ............... *H04B 3/52* (2013.01); *H04B 3/44* (2013.01); *H04B 3/50* (2013.01)

(58) Field of Classification Search
CPC ... H04B 3/52; H04B 3/44; H04B 3/50; H04B 3/54; H04B 3/56
See application file for complete search history.

(56) References Cited

U.S. PATENT DOCUMENTS

| 7,184,756 B2 * | 2/2007 | Kelley | H04M 1/7246 455/418 |
| 9,971,021 B2 | 5/2018 | Moses et al. | |

(Continued)

FOREIGN PATENT DOCUMENTS

EP 3407388 A1 11/2018

OTHER PUBLICATIONS

Extended European Search Report; Application No. 22200407.9-1213; Issued Feb. 27, 2023; 9 pages.

*Primary Examiner* — David S Huang
(74) *Attorney, Agent, or Firm* — CANTOR COLBURN LLP

(57) ABSTRACT

A node of a radio frequency system can include a signal splitter, a power rectifier and conditioner, a communication filter, and a network processor. The signal splitter is configured to split a radio frequency transmission between a power path and a communications path within the node. The power rectifier and conditioner are configured to produce a conditioned power signal based on power received through the power path. The communication filter of the communications path is configured to produce a filtered communication signal. The network processor is powered by the conditioned power signal and configured to extract encoded information from the filtered communication signal.

20 Claims, 6 Drawing Sheets

(51) Int. Cl.
   *H01P 5/00*    (2006.01)
   *H04B 3/44*    (2006.01)
   *H04B 3/50*    (2006.01)

(56) References Cited

U.S. PATENT DOCUMENTS

| | | |
|---|---|---|
| 10,051,345 B2 | 8/2018 | Mantese et al. |
| 10,638,207 B2 | 4/2020 | Mantese et al. |
| 10,884,118 B2 | 1/2021 | Hammerschmidt et al. |
| 10,998,958 B1 | 5/2021 | Gilson et al. |
| 11,652,508 B2 * | 5/2023 | Gilson .................... H04B 3/50 375/257 |
| 2017/0238070 A1 | 8/2017 | Mantese et al. |
| 2020/0366275 A1 | 11/2020 | Rokhsaz |
| 2021/0250081 A1 | 8/2021 | Gilson et al. |
| 2023/0115284 A1 | 4/2023 | Gilson |

* cited by examiner

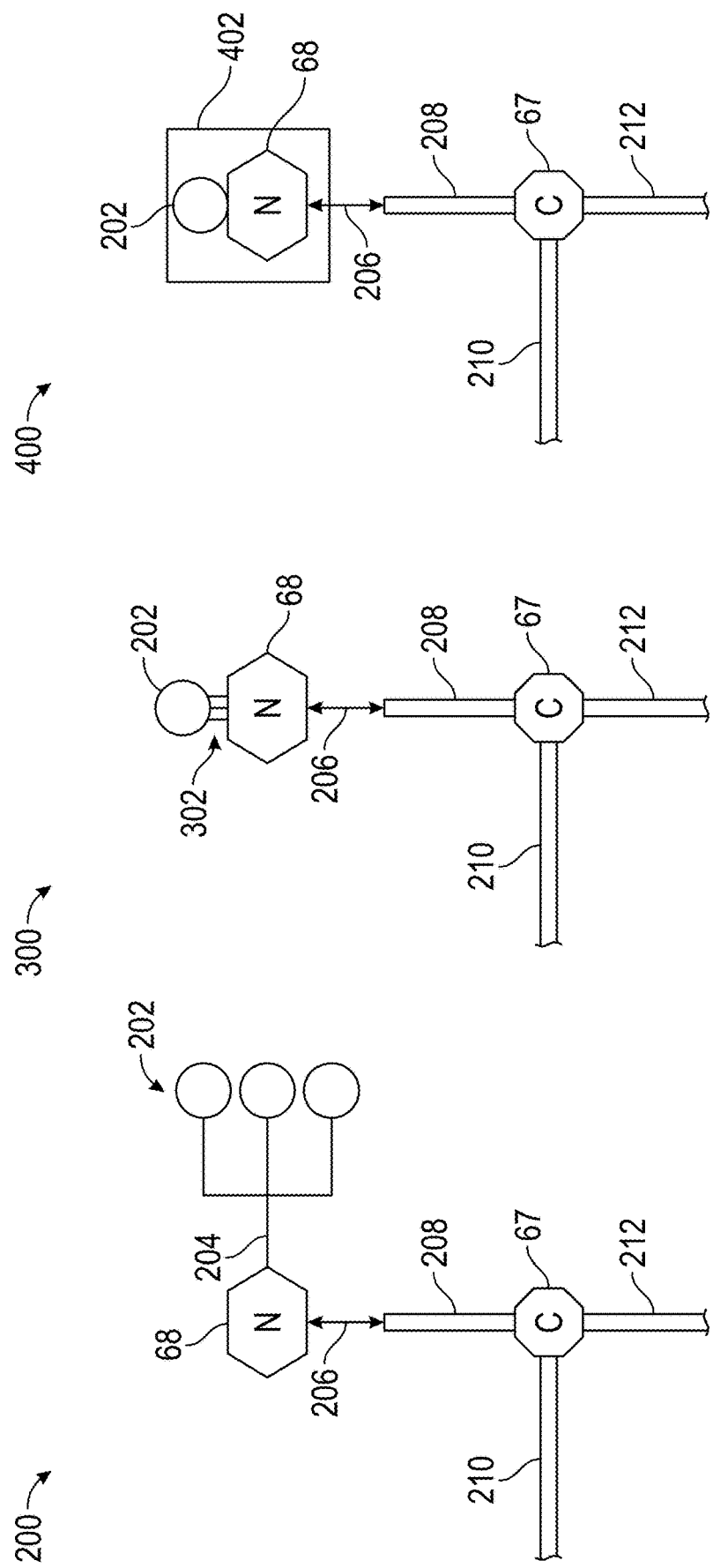

RADIO FREQUENCY WAVEGUIDE SYSTEM NODES

CROSS-REFERENCE TO RELATED APPLICATIONS

This application is a continuation of U.S. application Ser. No. 17/497,616 filed Oct. 8, 2021, the disclosure of which is incorporated herein by reference in its entirety.

BACKGROUND

This disclosure relates to electromagnetic communication, and more particularly to a radio frequency waveguide system with nodes.

As control and health monitoring systems become more complex, the interconnect count between system components increases, which also increases failure probabilities. With the increase in interconnects, large amounts of cabling may be used to connect sensors and actuators to controllers and/or diagnostic units of a machine. Long cable runs, including multiple wires, can add substantial weight and may increase susceptibility to noise effects and/or other forms of signal degradation. Increased wire connections can also result in a larger number of wire harnesses to remove and attach when servicing machine components. A larger number of wires and wire harnesses can increase the possibility of damage at pin/socket interconnects, particularly when the wire harnesses are attached and detached from components.

To achieve desired control and/or health monitoring, sensing systems may need information from locations that can be difficult to access due to moving parts, internal operating environment or machine configuration. The access limitations can make wire routing bulky, expensive, and potentially vulnerable to interconnect failures. Sensor and interconnect operating environments for desired sensor locations may exceed the capability of interconnect systems. In some cases, cable cost, volume, and weight may exceed desired limits for practical applications. Placement options and total number of sensors and actuators that may be installed in a machine can be limited by wiring and connector impacts on weight, reliability, physical sizing, and operating temperature limitations.

BRIEF DESCRIPTION

According to one embodiment, a radio frequency system can include a signal splitter, a power rectifier and conditioner, a communication filter, and a network processor. The signal splitter is configured to split a radio frequency transmission between a power path and a communications path within the node. The power rectifier and conditioner are configured to produce a conditioned power signal based on power received through the power path. The communication filter of the communications path is configured to produce a filtered communication signal. The network processor is powered by the conditioned power signal and configured to extract encoded information from the filtered communication signal.

In addition to one or more of the features described above or below, or as an alternative, further embodiments may include a control processor configured to interface with a sensor and/or an actuator and to communicate with the network processor, where the control processor is powered by the conditioned power signal.

In addition to one or more of the features described above or below, or as an alternative, further embodiments may include a sensor/actuator interface interposed between the control processor and the sensor and/or the actuator, where the sensor/actuator interface is powered by the conditioned power signal and configured to provide power to the sensor and/or the actuator.

In addition to one or more of the features described above or below, or as an alternative, further embodiments may include a power filter of the power path.

In addition to one or more of the features described above or below, or as an alternative, further embodiments may include where the power rectifier and conditioner includes a power splitter coupled to two or more rectification paths.

In addition to one or more of the features described above or below, or as an alternative, further embodiments may include a power threshold trigger configured to selectively output the conditioned power signal based on a power level output exceeding a power threshold.

In addition to one or more of the features described above or below, or as an alternative, further embodiments may include where the communication filter is configured to extract the filtered communication signal from a portion of the radio frequency transmission.

According to another embodiment, a system for a machine can include a network of a plurality of nodes distributed throughout the machine, each of the nodes associated with at least one sensor and/or actuator of the machine and operable to communicate through one or more radio frequencies. At least one of the nodes includes: a signal splitter configured to split a radio frequency transmission between a power path and a communications path within the node, a power rectifier and conditioner configured to produce a conditioned power signal based on power received through the power path, a communication filter of the communications path configured to produce a filtered communication signal, and a network processor powered by the conditioned power signal and configured to extract encoded information from the filtered communication signal.

In addition to one or more of the features described above or below, or as an alternative, further embodiments may include where the at least one of the nodes includes a control processor configured to interface with a sensor and/or an actuator of the at least one sensor and/or actuator of the machine and to communicate with the network processor, where the control processor is powered by the conditioned power signal.

In addition to one or more of the features described above or below, or as an alternative, further embodiments may include where the at least one of the nodes includes a sensor/actuator interface interposed between the control processor and the sensor and/or the actuator, where the sensor/actuator interface is powered by the conditioned power signal and configured to provide power to the sensor and/or the actuator.

In addition to one or more of the features described above or below, or as an alternative, further embodiments may include where the at least one of the nodes includes a power filter of the power path.

According to another embodiment, a method can include receiving a radio frequency transmission at a node in a radio frequency system comprising a plurality of nodes. The radio frequency transmission can be split between a power path and a communications path within the node. Power rectification and conditioning can be applied to power received through the power path to produce a conditioned power signal. Power can be provided to a network processor of the node based on the conditioned power signal. A communication filter can be applied to a communications path signal of the communications path to produce a filtered communication signal. The filtered communication signal can be provided to the network processor of the node to extract encoded information.

In addition to one or more of the features described above or below, or as an alternative, further embodiments may include interfacing a control processor with the network processor and a sensor and/or an actuator, where the control processor is powered by the conditioned power signal.

In addition to one or more of the features described above or below, or as an alternative, further embodiments may include performing power filtering of the power path.

In addition to one or more of the features described above or below, or as an alternative, further embodiments may include outputting the conditioned power signal based on a power threshold trigger detecting a power level output exceeding a power threshold.

A technical effect of the apparatus, systems and methods is achieved by a radio frequency waveguide system as described herein.

BRIEF DESCRIPTION OF THE DRAWINGS

The following descriptions should not be considered limiting in any way. With reference to the accompanying drawings, like elements are numbered alike:

FIG. 3 is a schematic view of a configuration including an interface node of a radio frequency waveguide system configured to communicate with end nodes through a wired interface in accordance with an embodiment of the disclosure;

FIG. 4 is a schematic view of a configuration including an interface node of a radio frequency waveguide system configured to communicate with an end node through a pin adapter interface in accordance with an embodiment of the disclosure;

FIG. 5 is a schematic view of a configuration including an interface node of a radio frequency waveguide system combined with an end node in accordance with an embodiment of the disclosure;

DETAILED DESCRIPTION

A detailed description of one or more embodiments of the disclosed apparatus and method are presented herein by way of exemplification and not limitation with reference to the Figures.

Figure 1:
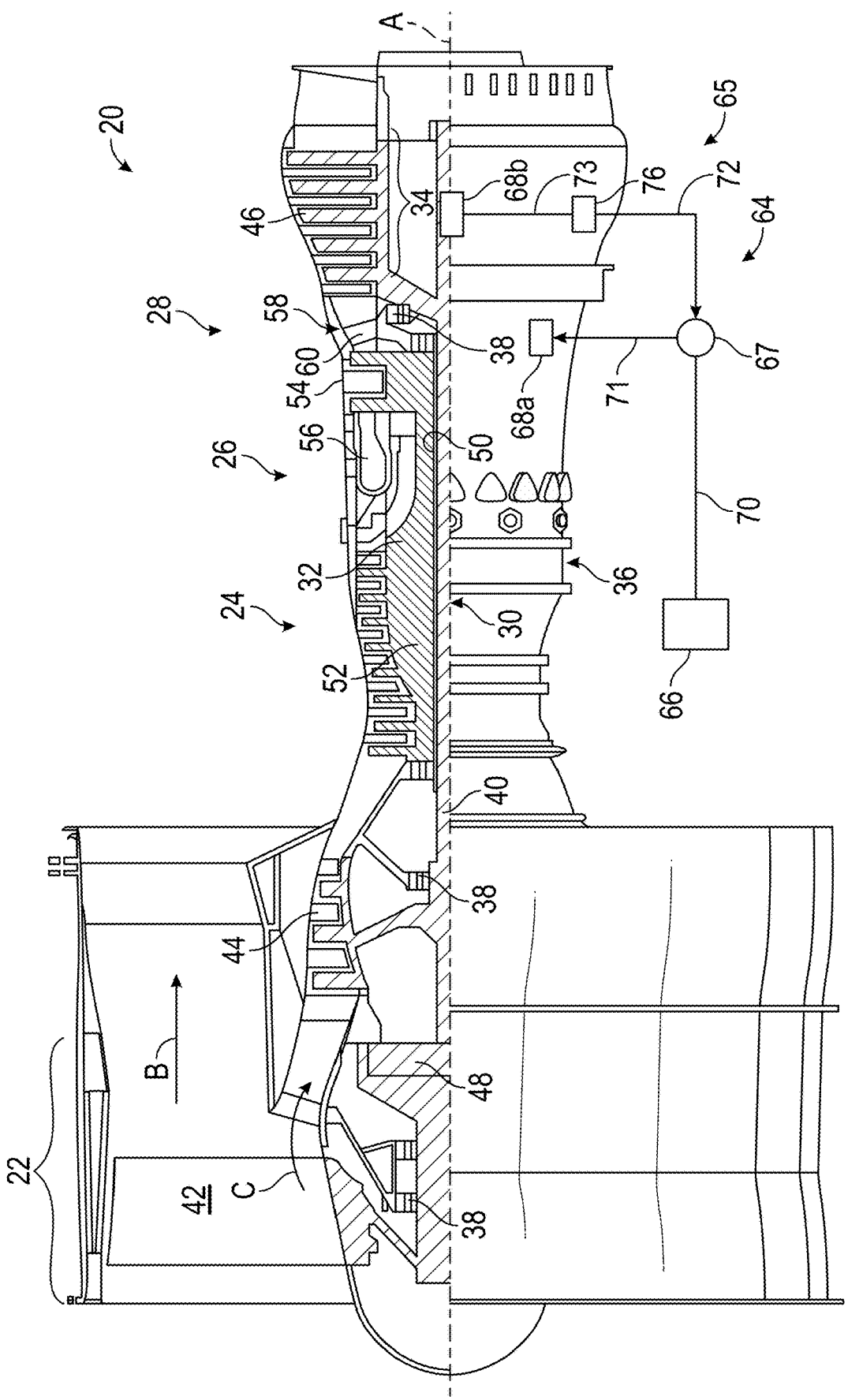
FIG. 1 is a cross-sectional view of a gas turbine engine as an example of a machine.

Various embodiments of the present disclosure are related to electromagnetic communication through and to components of a machine. FIG. 1 schematically illustrates a gas turbine engine 20 as one example of a machine as further described herein. The gas turbine engine 20 is depicted as a two-spool turbofan that generally incorporates a fan section 22, a compressor section 24, a combustor section 26 and a turbine section 28. The fan section 22 drives air along a bypass flow path B in a bypass duct to provide a majority of the thrust, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures or any other machine that requires sensors to operate with similar environmental challenges or constraints. Additionally, the concepts described herein may be applied to any machine or system comprised of control and/or health monitoring systems, for instance, in an aerospace environment. Other examples of machines in which embodiments can be implemented include an internal combustion engine, manufacturing machinery, submarine, aircraft, automobile, or any other machine with control and sensing components.

With continued reference to FIG. 1, the exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine engine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48. In direct drive configurations, the gear system 48 can be omitted.

The engine 20 in one example is a high-bypass geared aircraft engine. Low pressure turbine 46 pressure ratio is pressure measured prior to inlet of low pressure turbine 46 as related to the pressure at the outlet of the low pressure turbine 46 prior to an exhaust nozzle. A significant amount of thrust can be provided by the bypass flow B due to the high bypass ratio. The example low pressure turbine 46 can provide the driving power to rotate the fan section 22 and therefore the relationship between the number of turbine rotors 34 in the low pressure turbine 46 and the number of blades in the fan section 22 can establish increased power transfer efficiency.

The disclosed example gas turbine engine 20 includes a control and health monitoring system 64 (generally referred to as system 64) utilized to monitor component performance and function. The system 64 includes a network 65, which is an example of a guided electromagnetic transmission network. The network 65 includes a controller 66 operable to communicate with nodes 68a, 68b through electromagnetic signals. The nodes 68a, 68b can be distributed throughout the gas turbine engine 20 or other such machine. Node 68a is an example of an actuator node that can drive one or more actuators/effectors of the gas turbine engine 20. Node 68b is an example of a sensor node that can interface with one or more sensors of the gas turbine engine 20. Nodes 68a, 68b can include processing support circuitry to transmit/receive electromagnetic signals between sensors or actuators and the controller 66. A coupler 67 can be configured as a splitter between a waveguide 70 coupled to the controller 66 and waveguides 71 and 72 configured to establish wireless communication with nodes 68a and 68b respectively. The coupler 67 can be a simple splitter or may include a repeater function to condition electromagnetic signals sent between the controller 66 and nodes 68a, 68b. In the example of FIG. 1, a radio frequency-based repeater 76 is interposed between the coupler 67 and node 68b, where waveguide 72 is a first waveguide coupled to the coupler 67 and radio frequency-based repeater 76, and waveguide 73 is a second waveguide coupled to the radio frequency-based repeater 76 and node 68b. Collectively, waveguides 70, 71, 72, 73 are configured to guide transmission of the radio frequencies (e.g., electromagnetic signals) between the controller 66 and one or more of the nodes 68a, 68b. The transmission media within waveguides 70-73 may include dielectric or gaseous material. In embodiments, the waveguides 70-73 can be hollow metal tubes. The waveguides 70-73 may be rigid or may include flexible material. The disclosed system 64 may be utilized to control and/or monitor any component function or characteristic of a turbomachine, aircraft component operation, and/or other machines.

Prior control & diagnostic system architectures utilized in various applications include a centralized system architecture in which the processing functions reside in an electronic control module. Actuator and sensor communications were accomplished through analog wiring for power, command, position feedback, sensor excitation and sensor signals. Cables and connections include shielding to minimize effects caused by electromagnetic interference (EMI). The use of analog wiring and the required connections can limit application and capability of such systems due to the ability to locate wires, connectors and electronics in harsh environments that experience extremes in temperature, pressure, and/or vibration. Exemplary embodiments can use radio frequencies guided by the waveguides 70-73 in a wireless architecture to provide both electromagnetic communication signals and power to the individual elements of the network 65.

The use of electromagnetic radiation in the form of radio waves (MHz to GHz) to communicate and power the sensors and actuators using a traditionally complex wired system provides substantial architectural simplification, especially as it pertains to size, weight, and power (SWaP). Embodiments provide extension of a network where reduced SNR may compromise network performance by trading off data rates for an expansion of the number of nodes and distribution lines; thereby providing more nodes/sensors, with greater interconnectivity.

Figure 2:
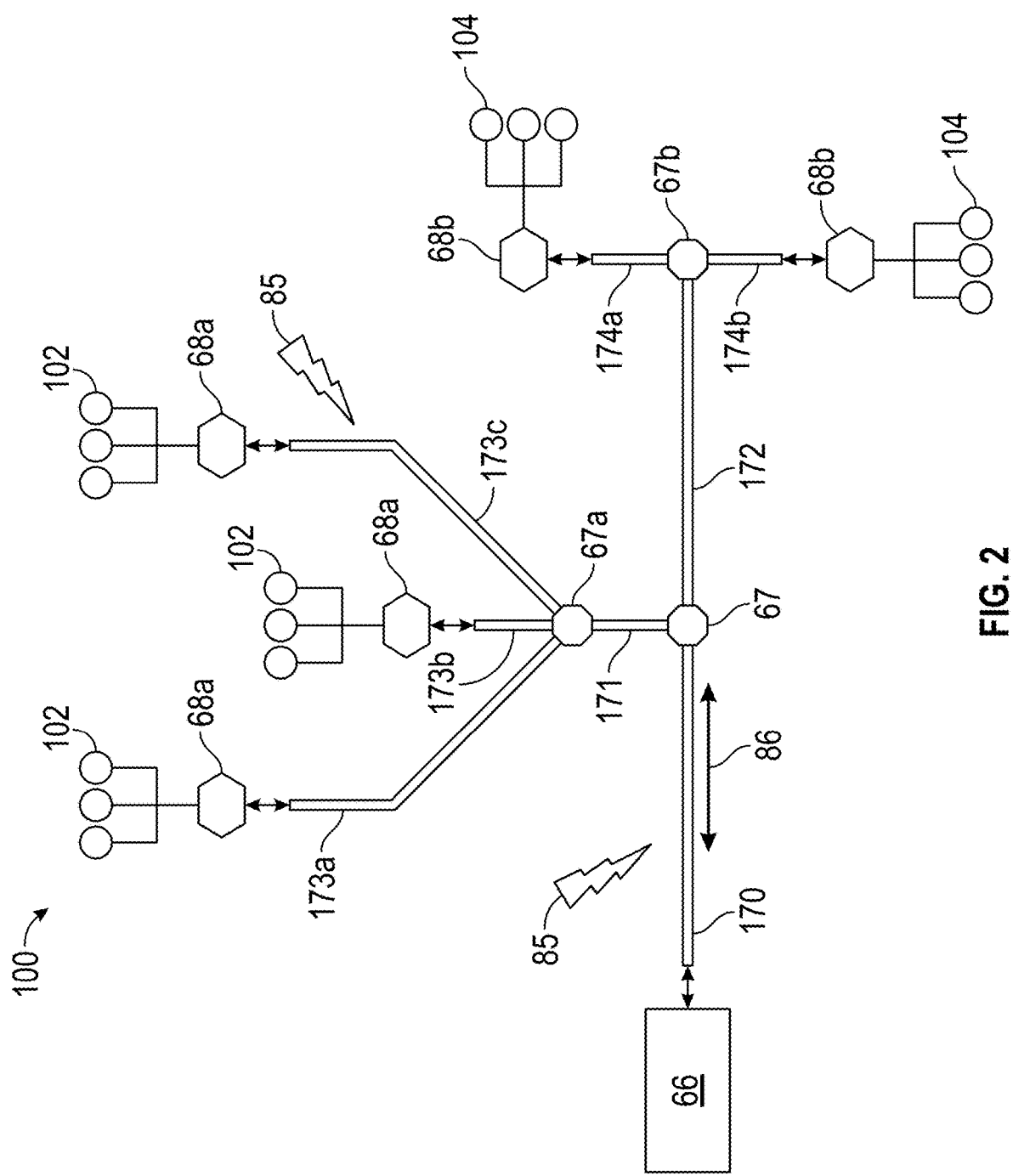
FIG. 2 is a schematic view of a guided electromagnetic transmission network in accordance with an embodiment of the disclosure.

Referring to FIG. 2, a guided electromagnetic transmission network 100 is depicted as an example expansion of the network 65 of FIG. 1. The guided electromagnetic transmission network 100 can include the controller 66 coupled to coupler 67 through waveguide 170. The coupler 67 is further coupled to coupler 67a through waveguide 171 and to coupler 67b through waveguide 172. Coupler 67a is further coupled to three nodes 68a through waveguides 173a, 173b, 173c in parallel. Each of the nodes 68a can interface or be combined with multiple actuators 102. Coupler 67b is also coupled to two nodes 68b through waveguides 174a, 174b in parallel. Each of the nodes 68b can interface or be combined with multiple sensors 104. Although the example of FIG. 2 depicts connections to actuators 102 and sensors 104 isolated to different branches, it will be understood that actuators 102 and sensors 104 can be interspersed with each other and need not be isolated on dedicated branches of the guided electromagnetic transmission network 100. Couplers 67, 67a, 67b can be splitters and/or can incorporate instances of the radio frequency-based repeater 76 of FIG. 1. Further, one or more instances of the radio frequency-based repeater 76 can be installed at any of the waveguides 170, 171, 172, 173a-c, and/or 174a-b depending on the signal requirements of the guided electromagnetic transmission network 100.

Nodes 68a, 68b can be associated with particular engine components, actuators or any other machine part from which information and communication is performed for monitoring and/or control purposes. The nodes 68a, 68b may contain a single or multiple electronic circuits or sensors configured to communicate over the guided electromagnetic transmission network 100.

The controller 66 can send and receive power and data to and from the nodes 68a, 68b. The controller 66 may be located on equipment near other system components or located remotely as desired to meet application requirements.

A transmission path (TP) between the controller 66 and nodes 68a, 68b can be used to send and receive data routed through the controller 66 from a control module or other components. The TP may utilize waveguides for electromagnetic communication including radio frequency/microwave electromagnetic energy. The interface between the controller 66 and nodes 68a, 68b can transmit power and communication signals.

The example nodes 68a, 68b may include radio-frequency identification devices along with processing, memory and/or the interfaces to connect to conventional sensors or actuators, such as solenoids or electro-hydraulic servo valves. The waveguides 170, 171, 172, 173a-c, and/or 174a-b can be shielded paths that support electromagnetic communication, including, for instance, radio frequency, microwaves, magnetic or optic waveguide transmission. Shielding can be provided such that electromagnetic energy or light interference 85 with electromagnetic signals 86 (shown schematically as arrows) are mitigated in the guided electromagnetic transmission network 100. Moreover, the shielding provides that the electromagnetic signals 86 are less likely to propagate into the environment outside the guided electromagnetic transmission network 100 and provide unauthorized access to information. In some embodiments, guided electromagnetic radiation is in the range 1-100 GHz. Electromagnetic radiation can be more tightly arranged around specific carrier frequencies, such as 3-4.5 GHz, 24 GHz, 60 GHz, or 76-77 GHz as examples in the microwave spectrum. One or more carrier frequencies can transmit electric power, as well as communicate information, to multiple nodes 68a, 68b using various modulation and signaling techniques.

The nodes 68a with actuators 102 may include control devices, such as a solenoid, switch or other physical actuation devices. Radio frequency identification, electromagnetic or optical devices implemented as the nodes 68b with sensors 104 can provide information indicative of a physical parameter, such as pressure, temperature, speed, proximity, vibration, identification, and/or other parameters used for identifying, monitoring or controlling component operation. Signals communicated in the guided electromagnetic transmission network 100 may employ techniques such as checksums, hash algorithms, error control algorithms and/or encryption to mitigate cyber security threats and interference.

The guided electromagnetic transmission network 100 may be installed in a mixed temperature environment, such as a machine having a hotter portion and a cooler portion. In reference to the example of FIG. 1, the fan section 22 and compressor section 24 of the gas turbine engine 20 can be designated as cooler portions relative to hotter portions of the gas turbine engine 20, such as the combustor section 26 and turbine section 28. To further accommodate the temperature variations within the gas turbine engine 20, a variety of approaches can be used. As one example, electronics devices within the nodes 68a, 68b, actuators 102, and/or sensors 104 can include wide band gap semiconductor devices, such as silicon carbide or gallium nitride devices supporting higher operating temperatures than typical semiconductor devices. Placement of the nodes 68a, 68b can also impact performance capabilities in the hotter portion of the machine. Where actuators 102 or sensors 104 are needed at locations that would potentially exceed the desired operating temperature of the nodes 68a, 68b that directly interface with the actuators 102 or sensors 104, relatively short wired connections, referred to as "pigtails" can be used between the nodes 68a, 68b and the actuators 102 or sensors 104. The pigtail wiring can provide thermal separation and may support the use of legacy wired actuators 102 and sensors 104 to connect with nodes 68a, 68b. Further temperature accommodations may include cooling systems, heat sinks, and the like.

In some embodiments, shielding in the guided electromagnetic transmission network 100 can be provided such that power and communication signals are shielded from outside interference, which may be caused by environmental electromagnetic or optic interference. Moreover, the shielding limits intentional interference 85 with communication at each component. Intentional interference 85 may take the form of unauthorized data capture, data insertion, general disruption and/or any other action that degrades system communication. Environmental sources of interference 85 may originate from noise generated from proximate electrical systems in other components or machinery along with electrostatic and magnetic fields, and/or any broadcast signals from transmitters or receivers. Additionally, environmental phenomena, such as cosmic radio frequency radiation, lightning or other atmospheric effects, could interfere with local electromagnetic communications.

It should be appreciated that while the system 64 is explained by way of example with regard to a gas turbine engine 20, other machines and machine designs can be modified to incorporate built-in shielding for monitored or controlled components in a guided electromagnetic transmission network. For example, the system 64 can be incorporated in a variety of harsh environment machines, such as manufacturing and processing equipment, a vehicle system, an environmental control system, and all the like. As a further example, the system 64 can be incorporated in an aerospace system, such as an aircraft, rotorcraft, spacecraft, satellite, or the like. The disclosed system 64 includes the network 65, 100 that provides consistent communication with electromagnetic devices, such as the example nodes 68a, 68b, and removes variables encountered with electromagnetic communications such as distance between transmitters and receiving devices, physical geometry in the field of transmission, control over transmission media such as air or fluids, control over air or fluid contamination through the use of filtering or isolation and knowledge of temperature and pressure.

The system 64 provides for a reduction in cable and interconnecting systems to reduce cost and increases reliability by reducing the number of physical interconnections. Reductions in cable and connecting systems further provides for a reduction in weight while enabling additional redundancy. Moreover, additional sensors can be added without the need for additional wiring and physical connections to the controller 66, which may provide for increased system accuracy and response. Embodiments can provide a "plug-n-play" approach to add a new node, potentially without a requalification of the entire system but only the new component; thereby greatly reducing qualification burdens.

FIG. 3 is a schematic view of a configuration 200 including an interface node 68 of a radio frequency waveguide system, such as system 64 of FIG. 1, configured to communicate with end nodes 202 through a wired interface 204. The interface node 68 can be a generalized example of nodes 68a, 68b of FIGS. 1 and 2, where the end nodes 202 may include one or more actuators 102, one or more sensors 104, or a combination thereof. The interface node 68 can also be generally referred to as a node 68. The wired interface 204 may be a pigtail connection allowing for a relatively short length of wire to connect the interface node 68 with the end nodes 202. For instance, the length of the wired interface 204 may enable the interface node 68 to be placed in a relatively cooler portion of a machine than where the end nodes 202 are located, such as in a bypass duct or proximate to a cooling side of a heat exchanger. The wired interface 204 enables the interface node 68 to electrically interface with the end nodes 202 while supporting radio frequency communication 206 with other system components through one or more waveguides 208, 210, 212, couplers 67, and other such system elements as previously described with respect to FIGS. 1 and 2.

FIG. 4 is a schematic view of a configuration 300 including an interface node 68 of a radio frequency waveguide system, such as system 64 of FIG. 1, configured to communicate with an end node 202 through a pin adapter interface 302. The interface node 68 can be a generalized example of nodes 68a, 68b of FIGS. 1 and 2, where the end node 202 may be an actuator 102 or sensor 104. The pin adapter interface 302 can enable a direct connection between the interface node 68 and the end node 202 without a larger physical separation of the wired interface 204 of FIG. 3. The pin adapter interface 302 may have a socket connection to support in-field replacement of the end node 202 without replacing the interface node 68. Alternatively, the pin adapter interface 302 may be more securely coupled, for instance, by soldering or otherwise coupling pins of the end node 202 to the interface node 68. The pin adapter interface 302 enables the interface node 68 to electrically interface with the end nodes 202 while supporting radio frequency communication 206 with other system components through one or more waveguides 208, 210, 212, couplers 67, and other such system elements as previously described with respect to FIGS. 1 and 2. The pin adapter interface 302 may be a lighter weight than the wired interface 204 of FIG. 3. In contrast, the interface node 68 in configuration 300 may be placed in closer proximity to a same temperature environment of end node 202 than in configuration 200 of FIG. 3.

FIG. 5 is a schematic view of a configuration 400 including an interface node 68 of a radio frequency waveguide system, such as system 64 of FIG. 1, disposed in a shared housing 402 with an end node 202. The interface node 68 can be a generalized example of nodes 68a, 68b of FIGS. 1 and 2, where the end node 202 may include one or more actuators 102, one or more sensors 104, or a combination thereof within the shared housing 402. The shared housing 402 combines the interface node 68 and end node 202 as a line replaceable unit. The interface node 68 and end node 202 may be electrically coupled within the shared housing 402, while the interface node 68 supports radio frequency communication 206 with other system components through one or more waveguides 208, 210, 212, couplers 67, and other such system elements as previously described with respect to FIGS. 1 and 2.

Figure 6:
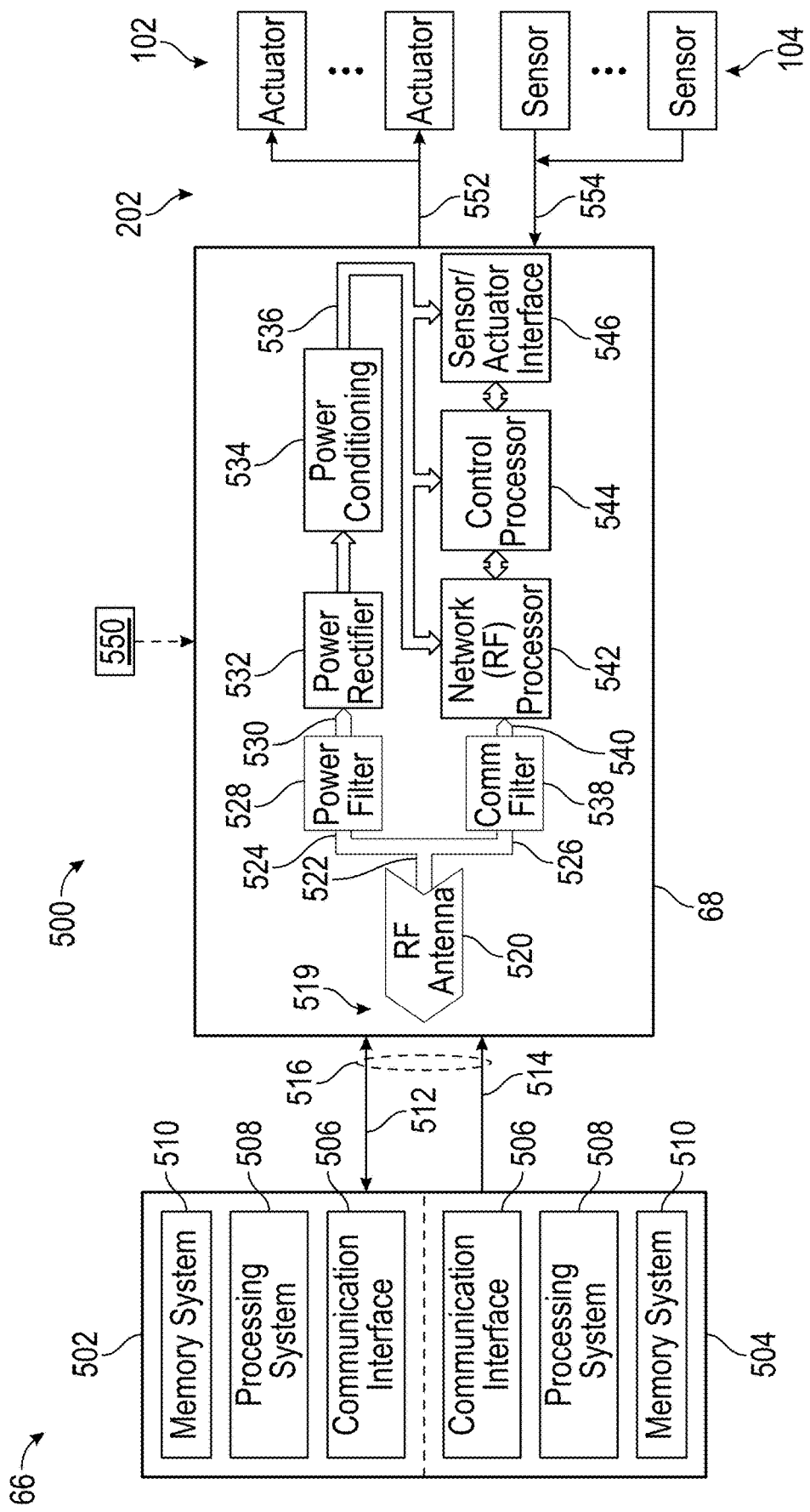
FIG. 6 is a schematic view of a portion of a radio frequency waveguide system in accordance with an embodiment of the disclosure.

FIG. 6 is a schematic view of a portion of a radio frequency waveguide system 500 illustrating further details of controller 66, interface node 68, and end nodes 202. In the example of FIG. 6, the controller 66 is depicted as a dual channel controller, where a first channel 502 and a second channel 504 can each include a communication interface 506, a processing system 508, and a memory system 510. The communication interface 506 can use a software defined radio or other protocol to support communication using electromagnetic signals. The processing system 508 can include any type or combination of central processing unit (CPU), including one or more of: a microprocessor, a digital signal processor (DSP), a microcontroller, an application specific integrated circuit (ASIC), a field programmable gate array (FPGA), or the like supported in the expected operating environment. The memory system 510 may include random access memory (RAM), read only memory (ROM), or other electronic, optical, magnetic, or any other computer readable medium onto which data and algorithms are stored in a non-transitory form.

A radio frequency communication link 512 between the controller 66 and interface node 68 can be shared by both the first channel 502 and second channel 504, or each channel 502, 504 may have independent radio frequency communication links 512 to one or more instances of the interface node 68. The controller 66 may also provide a power link 514 to the interface node 68. The radio frequency communication link 512 and power link 514 can be transmitted through radio frequencies within a same waveguide 516.

The interface node 68 can include a waveguide interface 519 configured to receive a radio frequency transmission through waveguide 516 in the radio frequency waveguide system 500. The waveguide interface 519 can include one or more radio frequency antennas 520 to receive and/or send transmissions between the interface node 68 and the controller 66 and/or other nodes. The waveguide interface 519 need not include the one or more radio frequency antennas 520 but may instead use a rectenna, a transformer, a waveguide adaptor, or other such structure to support signal/power transmission and reception through the waveguide 516. The interface node 68 can also include a signal splitter 522 configured to split the radio frequency transmission between a power path 524 and a communications path 526 within the node 68. A power filter 528 of the power path 524 is configured to produce a filtered power signal 530. A power rectifier 532 and conditioner 534 (also referred to as power conditioning circuit 534) are configured to produce a conditioned power signal 536. A communication filter 538 of the communications path 526 can be configured to produce a filtered communication signal 540. The power filter 528 and/or the communication filter 538 can be implemented using various filter components and structures. For example, the power filter 528 and/or the communication filter 538 can be implemented using bulk acoustic wave filters, feedthrough filters, waveguide filters, metallization-based filters, and other such structures. As such, a portion of the filtering may be performed external to the interface node 68, such as, within the waveguide 516 coupled to the waveguide interface 519.

The interface node 68 can also include a network processor 542 powered by the conditioned power signal 536 and configured to extract encoded information from the filtered communication signal 540. A control processor 544 can be configured to interface with one or more sensors 104 and/or actuators 102 and to communicate with the network processor 542. The control processor 544 can be powered by the conditioned power signal 536. A sensor/actuator interface 546 can be interposed between the control processor 544 and the sensors 104 and/or the actuators 102. The sensor/actuator interface 546 can be powered by the conditioned power signal 536 and configured to provide power to the sensors 104 and/or the actuators 102, for instance, through electrical interfacing 554, 552 respectively. The electrical interfacing 554, 552 can include use of the wired interface 204 of FIG. 3, the pin adapter interface 302 of FIG. 4, and/or a direct connection within the shared housing 402 of FIG. 5. In some embodiments, the conditioned power signal 536 may receive power from an alternate or supplemental source 550. For example, a battery backup or external power supply can be used as the alternate or supplemental source 550 to supplement power transmissions through the radio frequency waveguide system 500.

Electrical components within the interface node 68 can be made of high-temperature capable materials using, for example passive elements and/or semiconductor diodes to survive high temperatures, such as an engine core. For instance, components can be made of one or more wide band gap semiconductors. Materials for high-temperature application can include silicon carbide, gallium nitride, aluminum nitride, aluminum scrandium nitride, and other such materials. This can enable the interface node 68 to be placed in a hotter portion of a machine, such as the gas turbine engine 20, while the controller 66 may be at a cooler location, such as on a fan case of the fan section 22.

Processing performed by the control processor 544 can include signal filtering, engineering unit conversion, fault detection, fault isolation, and built-in test, for example. The network processor 542 can perform communication management for receiving and sending data on the radio frequency communication link 512. Depending on the processing capacity of the control processor 544 and network processor 542, more advanced sensing and detection algorithms can be locally incorporated to offload some processing burdens of the controller 66. Lower-level signal conditioning can be handled by the sensor/actuator interface 546, such as analog filtering, sampling, conversions, excitation signal generation, and other such functions. Although depicted separately, the network processor 542, the control processor 544, and/or the sensor/actuator interface 546 can be combined or further subdivided.

Figure 7:
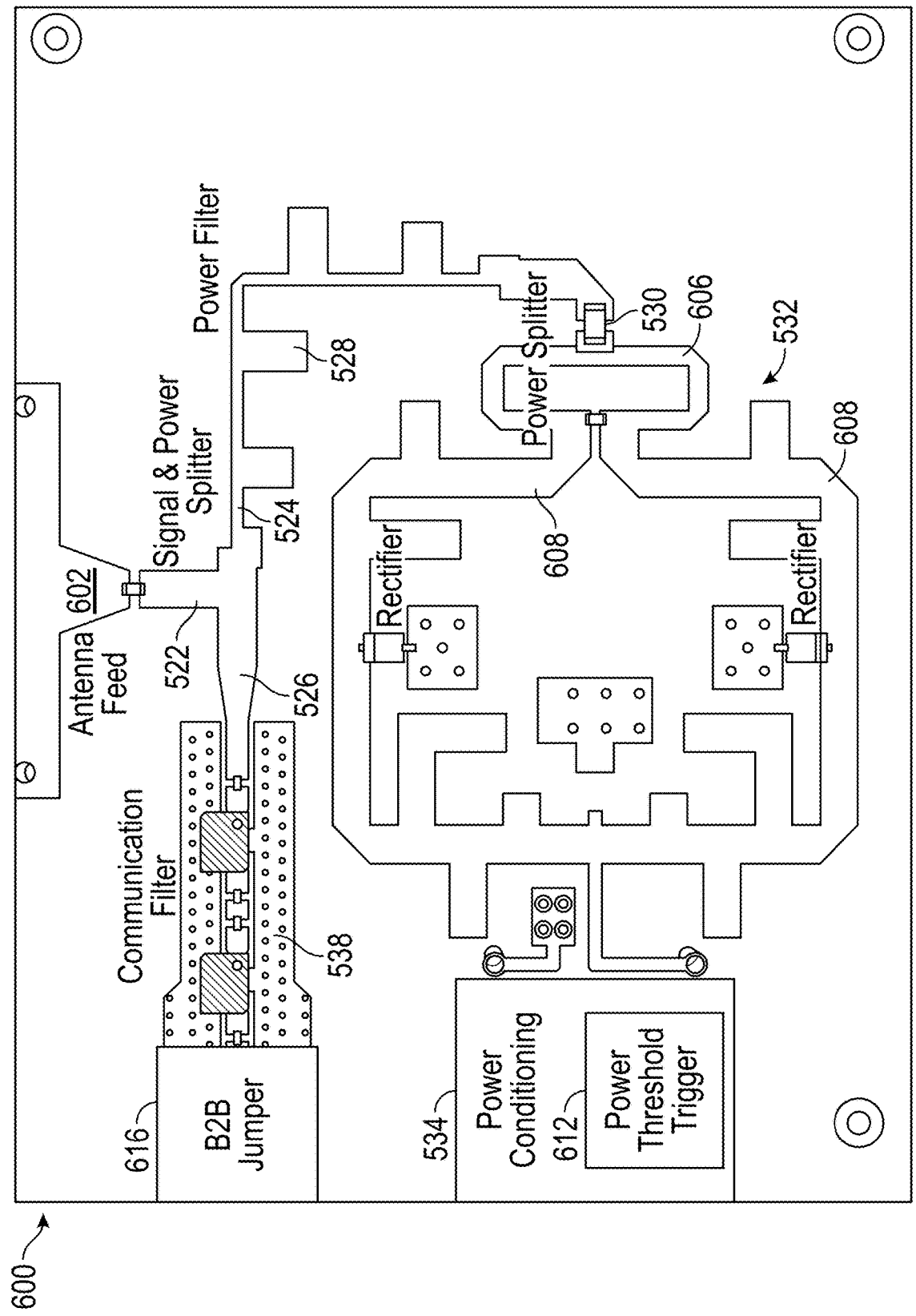
FIG. 7 is a schematic view of a portion of a node of a radio frequency waveguide system in accordance with an embodiment of the disclosure.

FIG. 7 depicts an example of a portion of the interface node 68 of the radio frequency waveguide system 500 of FIG. 6 in greater detail. An antenna feed 602 can link the waveguide interface 519 of FIG. 6, such as one or more radio frequency antennas 520 of FIG. 6, to the signal splitter 522 that performs power and signal splitting with respect to the power path 524 and the communications path 526. The power filter 528 can be implemented, for example, as a bandpass filter formed as a first metallization pattern on a circuit board 600 of the interface node 68 in the example of FIG. 7. Alternatively, the power filter 528 may be omitted or implemented using other filter structures/components, such as a combination of high pass and low pass filters or a combination of stopband filters. The power filter 528 can be omitted, for instance, where the signal and power splitter 522 is implemented as a diplexer that incorporates splitting and filtering components. The power rectifier 532 and conditioner 534 can be implemented, for example, as a power splitter 606 coupled to two or more rectification paths 608, and each of the rectification paths 608 can be coupled to a power conditioning circuit 534. The power splitter 606 can receive the filtered power signal 530 from the power filter 528. The two or more rectification paths 608 can include a second metallization pattern on the circuit board 600 of the interface node 68 or be implemented using other filter structures/components. For instance, the use of metallization patterns in the two or more rectification paths 608 can incorporate rectification filters. The power conditioning circuitry 534 can include a power threshold trigger 612 configured to selectively output the conditioned power signal 536 of FIG. 6 based on a power level output exceeding a power threshold. The power threshold trigger 612 can help to ensure that components of the interface node 68 are not partially powered which could result in an indeterminant or error state of operation. Further, the communication filter 538 can be configured to extract the filtered communication signal 540 of FIG. 6 from a portion of the radio frequency transmission received at the radio frequency antenna 520. Where the signal and power splitter 522 is implemented as a diplexer that incorporates splitting and filtering components, the communication filter 538 may be omitted or modified. A board-to-board jumper 616 can be used to connect the output of the communication filter 538 to another printed circuit board that may include devices and interfaces, such as the network processor 542, control processor 544, and sensor/actuator interface 546 of FIG. 6. The combined printed circuit boards may have a compact footprint, such as about 1.2 inches by 1.2 inches (i.e., about 3 cm by 3 cm). Although the example of FIG. 7 depicts two rectification paths 608, embodiments can include any number of rectification paths as needed depending on power level requirements and other such constraints.

Figure 8:
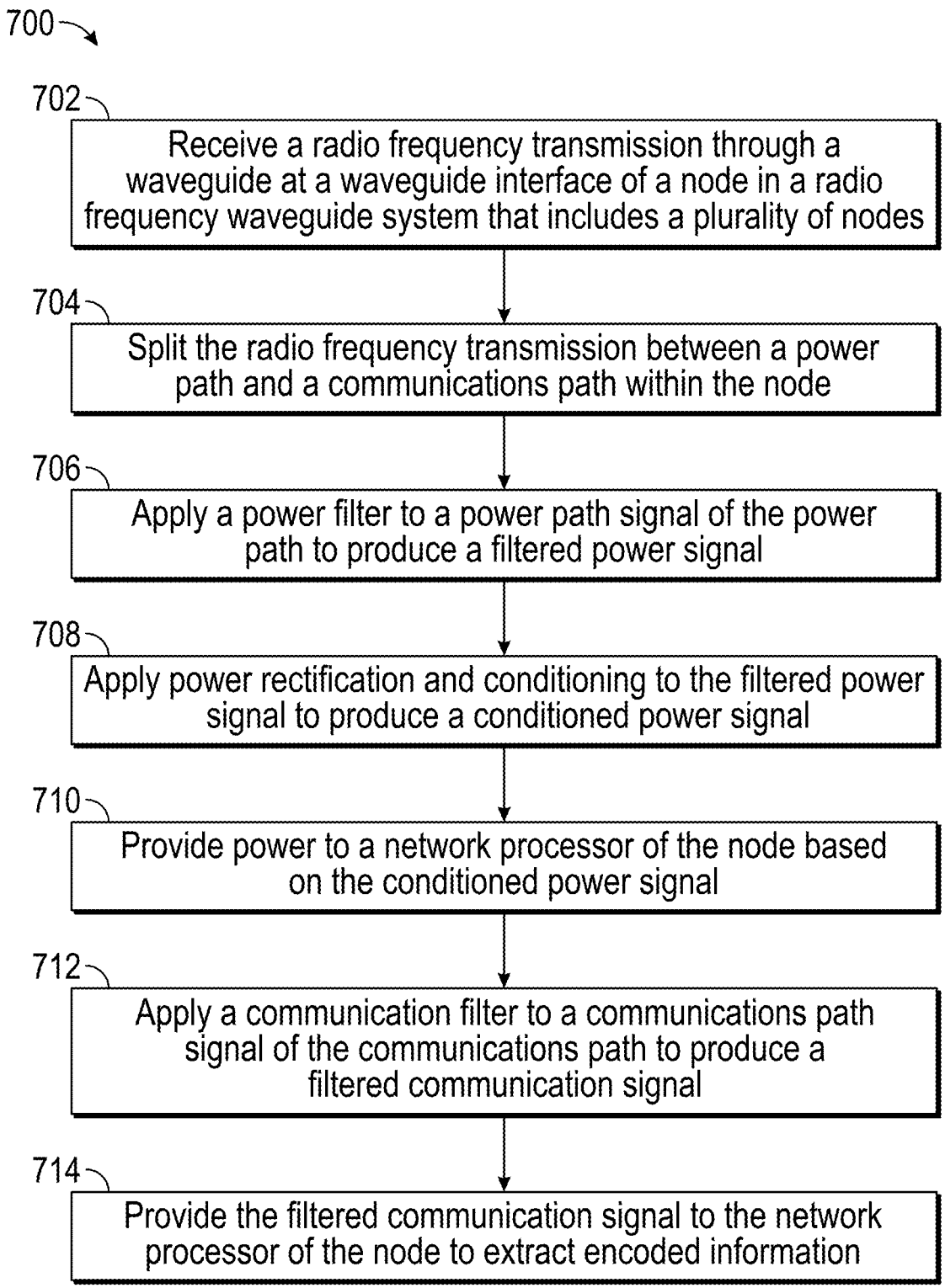
FIG. 8 is a flow chart illustrating a method in accordance with an embodiment of the disclosure.

FIG. 8 is a flow chart illustrating a method 700 of establishing electromagnetic communication through one or more nodes in a machine, such as the gas turbine engine 20 of FIG. 1 in accordance with an embodiment. The method 700 of FIG. 8 is described in reference to FIGS. 1-7 and may be performed with an alternate order and include additional steps. Further steps can be performed in parallel and are not necessarily sequential actions. For purposes of explanation, the method 700 is primarily described in reference to FIG. 6 but can also be implemented on the system 64 of FIG. 1, the guided electromagnetic transmission network 100 of FIG. 2, and other network variations and a variety of machines. The machine may operate in or produce a mixed temperature environment including higher temperatures (e.g., >150 degrees C.) beyond the normal range of microelectronics, which is typically less than 100 degrees C. The local temperature at different sections of the machine can vary substantially, such as upstream from combustion, at a fuel combustion location, and downstream from combustion.

At block 702, a radio frequency transmission is received through a waveguide 516 at a waveguide interface 519, such as at one or more radio frequency antennas 520 of a node 68 in a radio frequency waveguide system 500 that can include a plurality of nodes. Examples can include nodes 68, 68a, 68b, and the machine can be the gas turbine engine 20 of FIG. 1.

At block 704, the radio frequency transmission is split between a power path 524 and a communications path 526 within the node 68.

At block 706, a power filter 528 can be applied to a power path signal of the power path 524 to produce a filtered power signal 530. Alternatively, power filtering can be performed integrally with other components.

At block 708, power rectification and conditioning can be applied by power rectifier 532 and conditioner 534 to produce a conditioned power signal 536 based on power received through the power path 524. For instance, the filtered power signal 530 can be rectified and further conditioned using one or more bandpass filters.

At block 710, power can be provided to a network processor 542 of the node 68 based on the conditioned power signal 536.

At block 712, a communication filter 538 can be applied to a communications path signal of the communications path 526 to produce a filtered communication signal 540.

At block 714, the filtered communication signal 540 can be provided to the network processor 542 of the node 68 to extract encoded information. A control processor 544 can be interfaced with the network processor 542 and a sensor 104 and/or an actuator 102. The control processor 544 can be powered by the conditioned power signal 536.

In embodiments, the nodes 68, 68a, 68b can be portions of a network 65 configured to communicate through a plurality of electromagnetic signals, where the nodes 68, 68a, 68b are distributed throughout the machine, such as the gas turbine engine 20. Multiple nodes 68, 68a, 68b can be used in a complete system 64 to take advantage of architecture scalability. Each of the nodes 68, 68a, 68b can be associated with at least one actuator 102 or sensor 104 of the gas turbine engine 20. For example, one or more of the nodes 68, 68a, 68b can be located at one or more of a fan section 22, a compressor section 24, a combustor section 26, and/or a turbine section 28 of the gas turbine engine 20.

A variety of node configurations can be supported, and the node configurations can be mixed within the network. For example, at least one of the nodes 68a, 68b can be an interface node 68 that communicates with one or more end nodes 202. One or more end nodes 202 can be coupled to the interface node 68 through a wired interface 204. As further example, the one or more end nodes 202 can be coupled to the interface node 68 through a pin adapter interface 302. As another example, the one or more end nodes 202 can be coupled to the interface node 68 and disposed in a shared housing 402.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A node of a radio frequency system, the node comprising:
    a signal splitter configured to split a radio frequency transmission between a power path and a communications path within the node;
    a power rectifier and conditioner configured to produce a conditioned power signal based on power received through the power path;
    a communication filter of the communications path configured to produce a filtered communication signal; and
    a network processor powered by the conditioned power signal and configured to extract encoded information from the filtered communication signal.

2. The node of claim 1, further comprising:
    a control processor configured to interface with a sensor and/or an actuator and to communicate with the network processor, wherein the control processor is powered by the conditioned power signal.

3. The node of claim 2, further comprising:
    a sensor/actuator interface interposed between the control processor and the sensor and/or the actuator, wherein the sensor/actuator interface is powered by the conditioned power signal and configured to provide power to the sensor and/or the actuator.

4. The node of claim 1, further comprising a power filter of the power path.

5. The node of claim 4, wherein the power rectifier and conditioner comprises a power splitter coupled to two or more rectification paths.

6. The node of claim 5, further comprising a power threshold trigger configured to selectively output the conditioned power signal based on a power level output exceeding a power threshold.

7. The node of claim 1, wherein the communication filter is configured to extract the filtered communication signal from a portion of the radio frequency transmission.

8. A system for a machine, the system comprising:
    a network of a plurality of nodes distributed throughout the machine, each of the nodes associated with at least one sensor and/or actuator of the machine and operable to communicate through one or more radio frequencies, wherein the at least one of the nodes comprises:
        a signal splitter configured to split a radio frequency transmission between a power path and a communications path within the node;
        a power rectifier and conditioner configured to produce a conditioned power signal based on power received through the power path;
        a communication filter of the communications path configured to produce a filtered communication signal; and
        a network processor powered by the conditioned power signal and configured to extract encoded information from the filtered communication signal.

9. The system of claim 8, wherein the at least one of the nodes comprises:
    a control processor configured to interface with a sensor and/or an actuator of the at least one sensor and/or actuator of the machine and to communicate with the network processor, wherein the control processor is powered by the conditioned power signal.

10. The system of claim 9, wherein the at least one of the nodes comprises:
    a sensor/actuator interface interposed between the control processor and the sensor and/or the actuator, wherein the sensor/actuator interface is powered by the conditioned power signal and configured to provide power to the sensor and/or the actuator.

11. The system of claim 8, wherein the at least one of the nodes comprises a power filter of the power path.

12. The system of claim 11, wherein the power rectifier and conditioner comprises a power splitter coupled to two or more rectification paths.

13. The system of claim 12, wherein the at least one of the nodes comprises:
    a power threshold trigger configured to selectively output the conditioned power signal based on a power level output exceeding a power threshold.

14. The system of claim 8, wherein the communication filter is configured to extract the filtered communication signal from a portion of the radio frequency transmission.

15. A method comprising:
    receiving a radio frequency transmission at a node in a radio frequency system comprising a plurality of nodes;
    splitting the radio frequency transmission between a power path and a communications path within the node;
    applying power rectification and conditioning to power received through the power path to produce a conditioned power signal;
    providing power to a network processor of the node based on the conditioned power signal;
    applying a communication filter to a communications path signal of the communications path to produce a filtered communication signal; and providing the filtered communication signal to the network processor of the node to extract encoded information.

16. The method of claim 15, further comprising:
interfacing a control processor with the network processor and a sensor and/or an actuator, wherein the control processor is powered by the conditioned power signal.

17. The method of claim 15, further comprising performing power filtering of the power path.

18. The method of claim 17, wherein the power rectification and conditioning are performed by a power splitter coupled to two or more rectification paths.

19. The method of claim 18, further comprising:
outputting the conditioned power signal based on a power threshold trigger detecting a power level output exceeding a power threshold.

20. The method of claim 15, wherein the communication filter is configured to extract the filtered communication signal from a portion of the radio frequency transmission.

* * * * *